United States Patent
Johnson

(10) Patent No.: US 8,900,500 B2
(45) Date of Patent: Dec. 2, 2014

(54) FACET DEFORMATION MINIMIZING FRESNEL LENS DIE ROLLER AND MANUFACTURING METHOD

(75) Inventor: Neldon P. Johnson, Deseret, UT (US)

(73) Assignee: Black Night Enterprises, Inc., Charleston, Nevis ( * ) Notice: Subject to any disclaimer, the term of this patent is extended or adjusted under 35 U.S.C. 154(b) by 792 days.

(21) Appl. No.: 12/987,094

(22) Filed: Jan. 8, 2011

(65) Prior Publication Data

US 2012/0177768 A1     Jul. 12, 2012

(51) Int. Cl.
*B29C 43/46* (2006.01)
*B29D 11/00* (2006.01)
*B29C 59/04* (2006.01)

(52) U.S. Cl.
CPC .... *B29D 11/00288* (2013.01); *B29D 11/00269* (2013.01); *B29C 59/04* (2013.01)
USPC .............................. 264/219; 264/2.5; 425/363

(58) Field of Classification Search
CPC ....................... B29D 11/00288; B29D 11/0048
USPC .................................... 264/219, 2.5; 425/363
See application file for complete search history.

(56) References Cited

U.S. PATENT DOCUMENTS

| | | | |
|---|---|---|---|
| 1,954,636 A | 4/1934 | Lilienfeld | |
| 3,146,492 A | 9/1964 | Lemelson | |
| 3,348,264 A | 10/1967 | Rice et al. | |
| 4,272,471 A | 6/1981 | Walker | |
| 4,528,148 A | 7/1985 | Dotti | |
| 5,336,076 A | 8/1994 | Waldherr et al. | |
| 5,643,400 A | 7/1997 | Bernard et al. | |
| 5,656,209 A | 8/1997 | Benz et al. | |
| 5,770,122 A | 6/1998 | Curchod | |
| 5,870,233 A | 2/1999 | Benz et al. | |
| 6,062,844 A | 5/2000 | Biro | |
| 6,074,192 A * | 6/2000 | Mikkelsen | 425/327 |
| 6,628,460 B1 | 9/2003 | Ookawa et al. | |
| 6,678,097 B2 | 1/2004 | McKenney | |
| 6,693,748 B1 | 2/2004 | Fujimoto et al. | |
| 6,726,859 B2 | 4/2004 | Suzuki et al. | |
| 2002/0197346 A1 | 12/2002 | Papadopoulos | |
| 2004/0051948 A1 | 3/2004 | Reed | |
| 2004/0135273 A1 | 7/2004 | Parker et al. | |
| 2005/0280182 A1 | 12/2005 | Boegli | |
| 2006/0263463 A1 | 11/2006 | Clune et al. | |
| 2008/0150189 A1 * | 6/2008 | Johnson | 264/176.1 |

* cited by examiner

*Primary Examiner* — Yogendra Gupta
*Assistant Examiner* — Kimberly A Stewart
(74) *Attorney, Agent, or Firm* — J. David Nelson

(57) ABSTRACT

A die roller and method for making a die roller for use in manufacturing Fresnel lens angular segments or sub-segments, the die roller having one or more segment dies and curvilinear Fresnel facet dies, the Fresnel facet dies having a collar, a peak, and a base, the collar being sloped, the peak being rounded, and the base being rounded, according to a die algorithm based upon one or more facet factors, in order to reduce the deformation of Fresnel lens angular segments or sub-segments extruded with the die roller.

20 Claims, 14 Drawing Sheets

FACET DEFORMATION MINIMIZING FRESNEL LENS DIE ROLLER AND MANUFACTURING METHOD

BACKGROUND OF THE INVENTION

Devices and processes for extruding sheet plastic from raw plastic material such as ingots and pellets and the like are well known in the art. Similarly, devices and processes for extruding Fresnel lenses from plastic through the use of heat and roller equipment for the extrusion process and dies for impressing the facet grooves on the face of the lens are known in the art. For this application, the term "plastic" shall include thermoplastic and thermosetting polymers. Polycarbonates are a particular group of thermoplastic polymers. Generally speaking, thermoplastics soften and melt when enough heat is applied. Polyethylene, polystyrene, polyvinyl chloride and polytetrafluoroethylene are examples of thermoplastics. A thermosetting polymer or thermosetting plastic, also referred to as a thermoset, is a polymer material that irreversibly cures. The cure may be done through heat, a chemical reaction, or irradiation. Thermoset materials are usually liquid or malleable prior to curing and designed to be molded into their final form. A thermosetting polymer is a prepolymer in a soft solid or viscous state that changes irreversibly into an infusible, insoluble polymer network by curing. A cured thermosetting polymer is called a thermoset.

The use of Fresnel lenses for solar collectors is also known in the industry. Economic, operational, and maintenance considerations dictate that the use of a larger collector for solar collection applications is desirable. When a Fresnel lens is to be used for a solar collector, this usually dictates that the solar collector cannot be constructed of a single lens. Also, in the manufacturing of the Fresnel lens, ordinarily a size limitation is dictated by the size of the rollers that are used for the production of the Fresnel lens. This then requires that a solar collector be constructed from a composite of Fresnel lens components. It is also found that the use of a generally circular shape for a Fresnel lens is desirable for solar collector applications. Because of facet groove orientation limitations and geometric sizing and shape limitations, the manufacturing of Fresnel lens components for a generally circular solar collector is problematic.

An object of the present invention is to provide a die roller and a method for manufacturing a die roller for use in manufacturing Fresnel lens components for a generally circular solar collector that will provide for the matching of Fresnel lens facet grooves of the components with the desired overall pattern of the solar collector and will provide for economy in manufacturing, including the use of common size rollers and other common extrusion equipment and the minimization of material waste. For purposes of this application, the term "generally circular" shall be defined to include polygon shapes such as an octagonal or hexagonal shape which have sides which are roughly equidistant from the geometric center of the collector.

One of the principal reasons that Fresnel lenses have been used with very limited success for solar collectors is the extreme difficulty associated with extruding a lens without severely deforming the facets. This inherent problem in the manufacturing of Fresnel lenses is illustrated by the disclosures of U.S. Pat. No. 5,770,122 to Curchod ("Curchod"). The devices disclosed in Curchod are intended merely to improve the deformation of the facets of a linear Fresnel lens, after the lens has been extruded.

The principal factors that lead to the facet deformation which is inherent in the extrusion of Fresnel lenses include:

a. The relatively high temperature and the relatively low cooling rate of the plastics used for Fresnel lens extrusion.
b. The friction and surface bond between the die roller used for the extrusion process and the extruded lens.
c. Variation in the die facet and thus the lens facet cross sections.
d. For non-linear lenses, variation in the orientation of the die facets and thus the lens facets with respect to the direction of rotation of the die roller.
e. Non-uniform friction force and surface bond distributed on the lens facet cross sections by the die facets of the die roller.
f. Non-uniform cooling of the lens facet cross sections.
g. Variation in the optimum plastic temperature and roller temperature for different lens facet cross sections.
h. Variation in heat transfer rates for the different die facet cross sections.
i. Variation in heat transfer rates for the different lens facet cross sections.

All the foregoing problems are applicable to extruders extruding Fresnel lenses in any configuration, including extruders for producing simple linear Fresnel lenses such as that disclosed in Curchod. The foregoing problems are even more pronounced in the production of angular lens segments for generally circular Fresnel lenses which is one of the principal reasons why Fresnel lenses have not been used successfully in solar collectors to date.

Prior U.S. Pat. Nos. 7,789,650, 7,789,651, and 7,789,652 to Johnson (collectively the "Johnson Patents"), the present inventor, disclose roller extruders for use in manufacturing angular lens segments or sub-segments for generally circular solar collectors. U.S. Pat. Nos 7,789,650 and 7,789,651 disclose extruders for use in manufacturing angular lens sub-segments, i.e. with each revolution of the die roller one or more pairs of angular lens sub-segments are produced. U.S. Pat. No. 7,789,652 discloses an extruder for use in manufacturing angular lens segments, i.e. with each revolution of the die roller one or more pairs of angular lens segments are produced. Each of these lens sub-segments or segments have curved facets so that when they are mounted together in an appropriate configuration, incident solar radiation is focused on a common focal point or focal zone. For a solar collector, an energy absorber is placed at the common focal point or focal zone. The present inventor has found that for most solar collector applications, utilization of a focal zone is preferable to attempting to confine the focused incident radiation to a common focal point. The absorber efficiency is improved and the maximum temperature experienced on the surface of the absorber is reduced by distributing the focused radiation over a larger focal zone.

The inherent advantage in the utilization of a focal zone on the solar energy absorber is that it allows the facets of a Fresnel lens, including the facets of Fresnel lens angular segments or sub-segments as disclosed in the Johnson Patents, to have some deviations from the normal optimal design. A lens does not have to have the capability of producing an image. It merely has to direct the incident solar radiation to a focal zone on an energy absorber.

For the Fresnel lens extruders disclosed in the Johnson Patents or more generally for the die roller of any extruder providing for the extrusion of Fresnel lens angular segments or sub-segments of Fresnel lens angular segments, the varying cross-section of the die facets and the corresponding lens facets or grooves, and the varying angle of each facet with respect to the line of separation of the extruded lens segment or sub-segment from the die roller results in highly variable forces being exerted on the facets as they are separated from the corresponding contact surface on the die roller. In other words, the angle that the die facets and thus the lens facets at a particular longitudinal position on the line of separation make with the line of separation varies substantially with position on the line of separation and further vary substantially at that point on the line of separation as the die roller progresses through a revolution. As stated above, because (a) the line of separation of the facets of the extruded lens from the die roller varies from being longitudinal, i.e. aligned with the axis of the roller, to being lateral, i.e. perpendicular to the axis of the roller; and (b) the cross-section of the facets varies substantially with the position from the center of curvature, the extent of the deformation caused at the moment of or subsequent to the separation of the extruded lens from a die roller will vary substantially from insignificant deformation to substantial deformation. The ability of the lens assembled from the angular lens segments or sub-segments to focus the incident solar radiation on a desired focal zone of the energy absorber may be greatly impaired by the deformation of the lens facets.

It is an objective of the present invention to provide a die roller for the manufacturing of Fresnel lens angular segments or angular lens sub-segments which minimizes lens facet distortion while minimizing deviation from optimum design and optimal cross-section for the lens facets to be extruded.

It is a further objective of the present invention to provide a die roller for the extrusion of Fresnel lens angular segments or angular sub-segments which provide for optimization of the solar collector assembled from the angular segments or sub-segments in focusing of incident solar radiation on the focal zone of an energy absorber.

It is a further objective of the present invention to provide a die roller for the extrusion of Fresnel lens angular segments or angular sub-segments which optimizes the efficiency of the solar collector assembled from the angular segments or sub-segments extruded.

It is a further objective of the present invention to provide a method for manufacturing a die roller for meeting the foregoing objectives.

SUMMARY OF THE INVENTION

The die roller of the present invention has segment dies and Fresnel facet dies on the curvilinear surface of the die roller, which provide for the extrusion, for each revolution of the die roller, of angular lens sub-segments, namely an inner lens sub-segment and an outer lens sub-segment, or angular lens segments, having Fresnel lens facets. The angular lens segments or sub-segments extruded may be used for the assembly of a solar collector.

The facet die pitch of the Fresnel facet dies increases with radial displacement from the center of curvature. This is necessary because the amount of refraction of the rays of incident solar radiation must be progressively greater with radial distance from the center of the extruded Fresnel lens segment in order for the lens to focus the incident radiation on the focal zone of a solar energy absorber. The ideal cross-section of a Fresnel facet has a facet pitch which will provide for the desired refraction of the incident solar radiation and a facet collar which has a facet collar surface which is perpendicular to the planar lens surface. The facet toe of a Fresnel facet will preferably be contiguous to the facet heel of the adjacent facet. This minimizes the amount of incident solar radiation passing a non-refracting surface.

Unfortunately the optimal abrupt facet junction, between the refracting surface of a Fresnel facet and the facet collar of the adjacent facet as well as the optimal abrupt facet crown, which is the junction between the facet collar and the refracting surface of a Fresnel facet, are problematical for the extrusion separation, of the lens medium of the extruded lens segment or sub-segment from the facet dies of the die roller. Further, the facet die orientation of a facet die at a particular position on the die roller surface with respect to the die tangential progression at a particular die position on the roller, i.e. from the direction of rotation of the die roller surface, as well as the corresponding Fresnel facet orientation for an extruded lens segment or sub-segment, may also be problematic, depending on the magnitude and direction of the facet die offset angle between the facet die orientation and the die tangential progression, the cross-section of the facet die and other factors. The facet die orientation, and hence the facet die offset angle, will vary with the facet offset of the die position of a facet die from the adjacent segment die. Also, depending on the facet die orientation, the cross-section of the facet die, and other factors identified above, the collar radial orientation of the facet collars for a theoretically optimum facet die is also problematic for the extrusion separation of the die roller from the lens medium of the extruded lens segment or sub-segment. Lens deformation is caused by forces exerted on the extruded lens segment or sub-segment by the facet dies of the die roller at the time of separation.

A preferred embodiment of a facet die of the die roller of the present invention, regardless of the die pattern, i.e. the design of the angular lens segment or sub-segments to be extruded, may have a rounded facet die peak which provides for lens junction rounding of each lens facet junction; may have a rounded facet die base which provides for lens crown rounding of each lens facet crown; and may have a sloped facet die collar providing for a lens collar slope, in order to reduce the lens deformation at lens separation of the extruded lens segment or sub-segment from the die roller. Certain embodiments of the die roller may provide for a variation in the degree of lens junction rounding of the lens facet junction and the degree of lens crown rounding of the lens facet crown based on the facet die orientation and the resultant facet die offset angle which vary from one facet die peak point and the corresponding facet die base point to a successive facet die peak point and the corresponding facet die base point. Similarly, the facet die collar slope of the facet die collar may provide for a variation in the collar slope depending upon the facet die orientation, facet die cross-section, and other factors. For positions on the die roller where the separation of the extruded lens from the facets of the die roller will be difficult, the junction rounding, the crown rounding, the facet collar slope or any or all of them, may be varied as needed to minimize the resistance to extrusion separation of the Fresnel facets of the extruded lens from the facet dies and to minimize the resultant deformation of the Fresnel facets of the extruded lens. Other factors which may affect the optimization of the cross-section of the facet dies at a particular point are identified in the Detailed Description.

It will be noted that facet orientation varies significantly from the segment forward edge to the segment rear edge for most of the facets. Thus, in order to minimize deformation of the facet, collar slope will preferably be varied for all, most, or at least a substantial portion of the facets between the segment forward edge and the segment rear edge.

A die algorithm may utilize one or more "facet factors" in determining one or more of collar slope, crown rounding, or junction rounding. The algorithm may be used to vary the weight or importance of any or all of the facet factors when manufacturing the die roller of the present invention. While the present inventor believes that collar slope is the most important consideration in minimizing facet deformation at the time of separation of the facet die and the Fresnel facet of the extruded lens, other users may conclude otherwise.

The roller surface of the die roller, for preferred embodiments, has a surface base plating of a malleable metal or alloy, the roller surface having a plurality of facet dies formed in the surface base plating. For preferred embodiments, the metal or alloy of the surface base plating has a high thermal conductivity, such as a copper alloy. Under a preferred embodiment of the method of the present invention, the facet dies are etched in the surface plating, one that may be etched to a high degree of precision, but will hold the form of the facet dies through long term, repetitive use at the high temperature required for the extrusion of the Fresnel lens segments or sub-segments. For preferred embodiments, the surface base plating is further plated with a finish plating of hardening metal or alloy after the facet dies are etched in the surface base plating.

DETAILED DESCRIPTION

Figure 1:
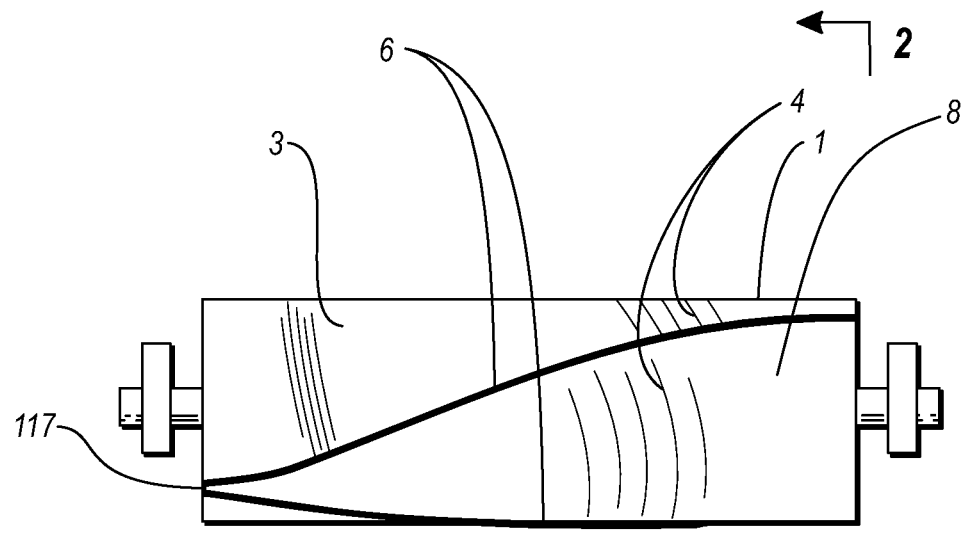
FIG. 1 is a side elevation view of a preferred embodiment of the die roller of the present invention for manufacturing Fresnel lens angular subsegments.
Figure 2:
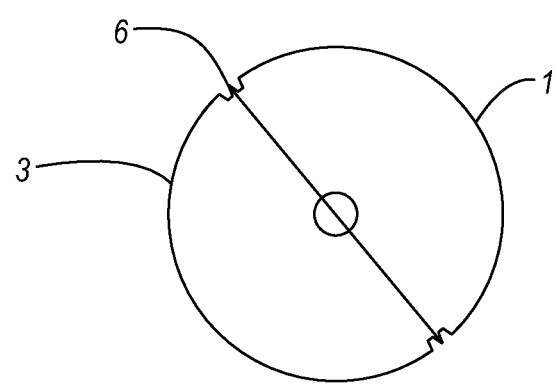
FIG. 2 is an end view elevation of a preferred embodiment of the die roller of the present invention for manufacturing Fresnel lens angular subsegments.
Figure 3:
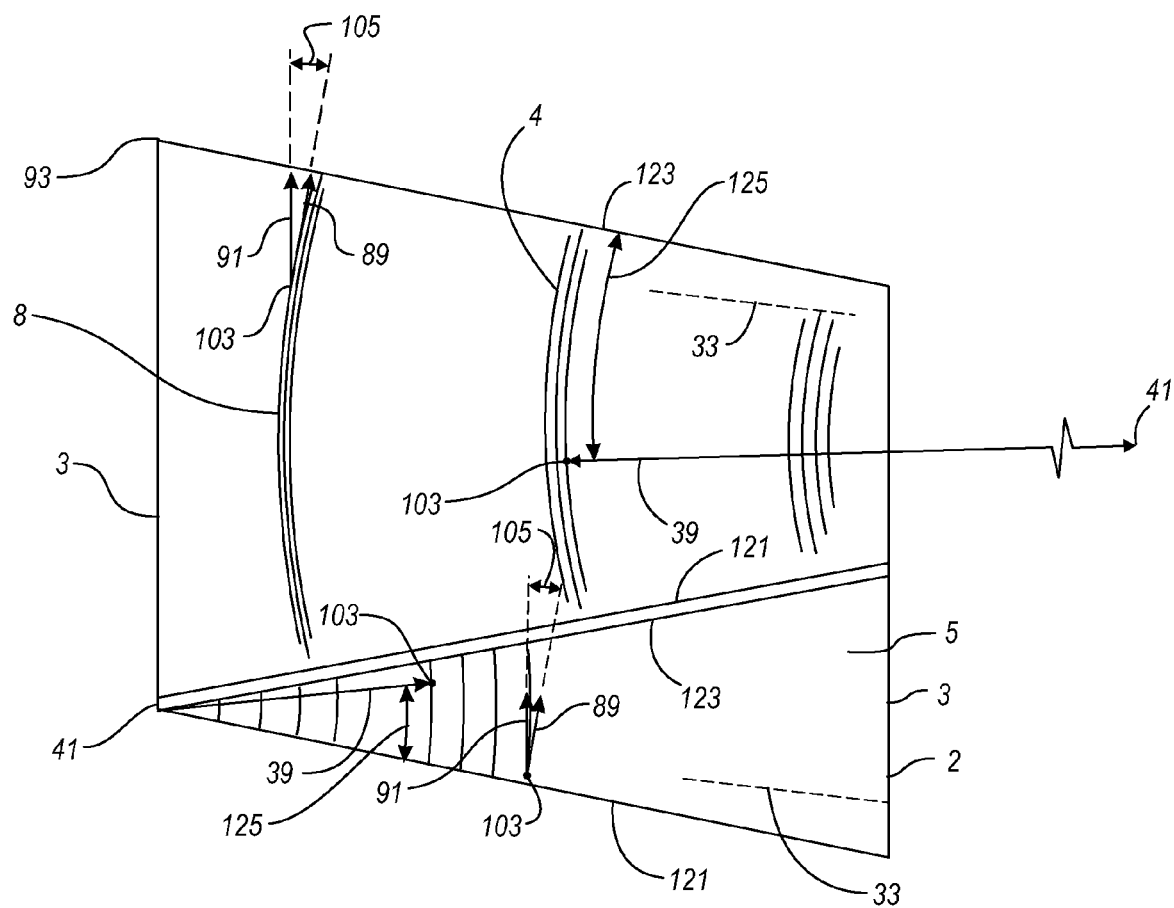
FIG. 3 is a planar view of the surface of a preferred embodiment of the die roller of the present invention for manufacturing Fresnel lens angular subsegments.
Figure 4:
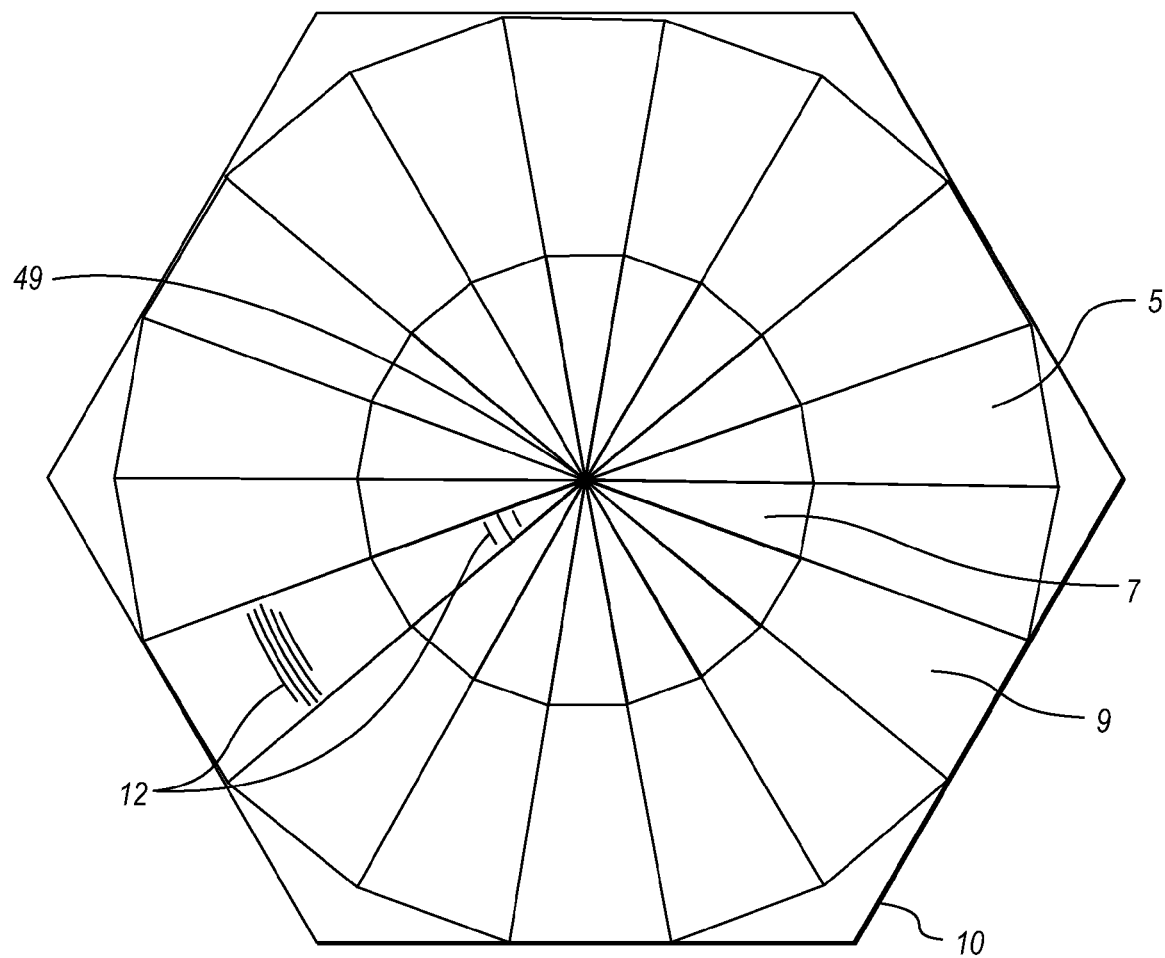
FIG. 4 is an embodiment of a solar collector configured with Fresnel lens angular subsegments manufactured with the die roller of FIGS. 1-3.
Figure 5:
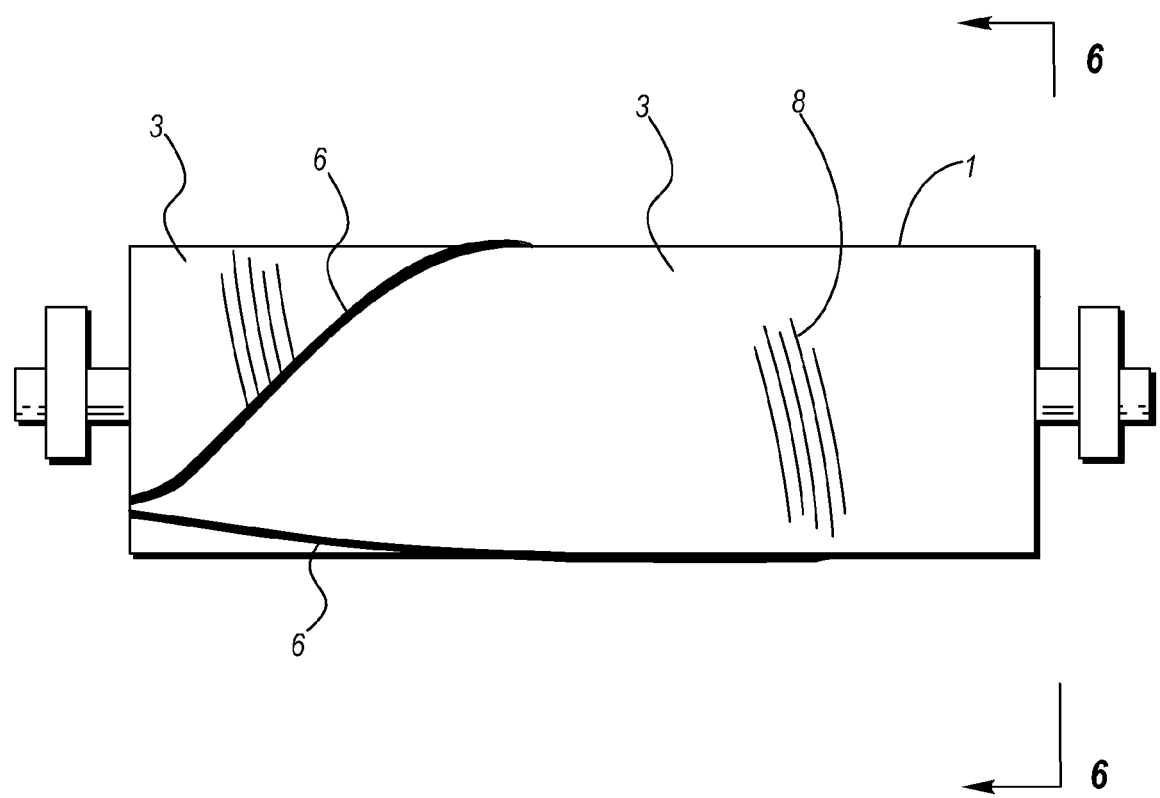
FIG. 5 is a side elevation view of a preferred embodiment of the die roller of the present invention for manufacturing Fresnel lens angular segments.
Figure 6:
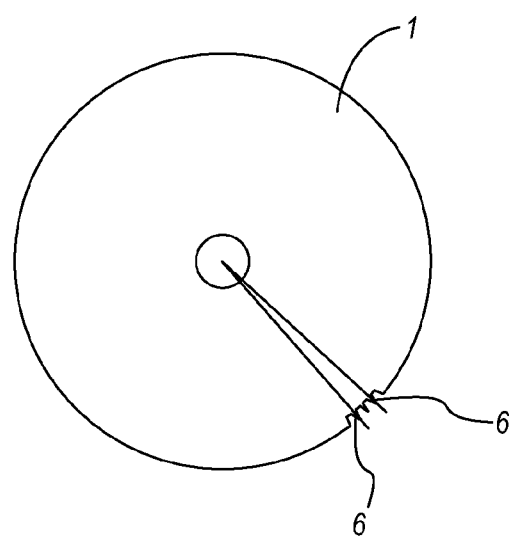
FIG. 6 is an end view elevation of a preferred embodiment of the die roller of the present invention for manufacturing Fresnel lens angular segments.
Figure 7:
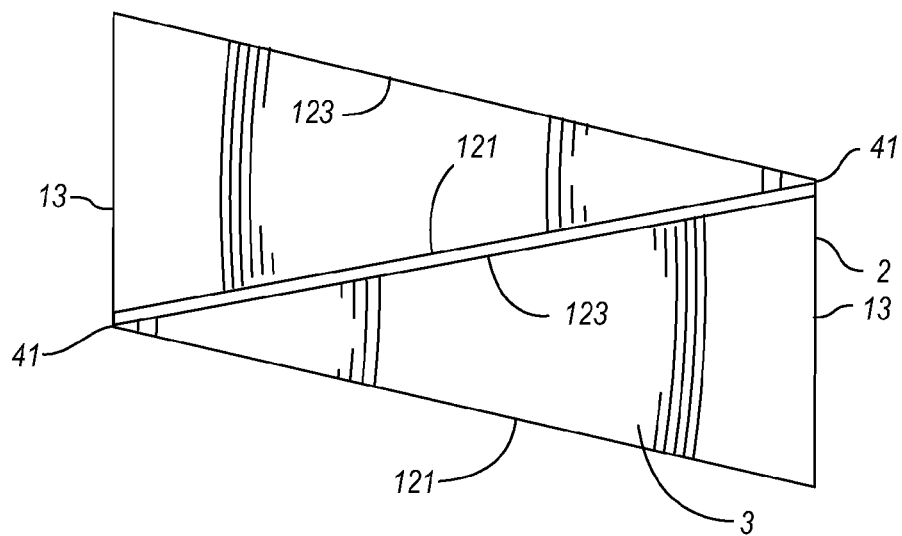
FIG. 7 is a planar view of the surface of a preferred embodiment of the die roller of the present invention for manufacturing Fresnel lens angular segments.
Figure 8:
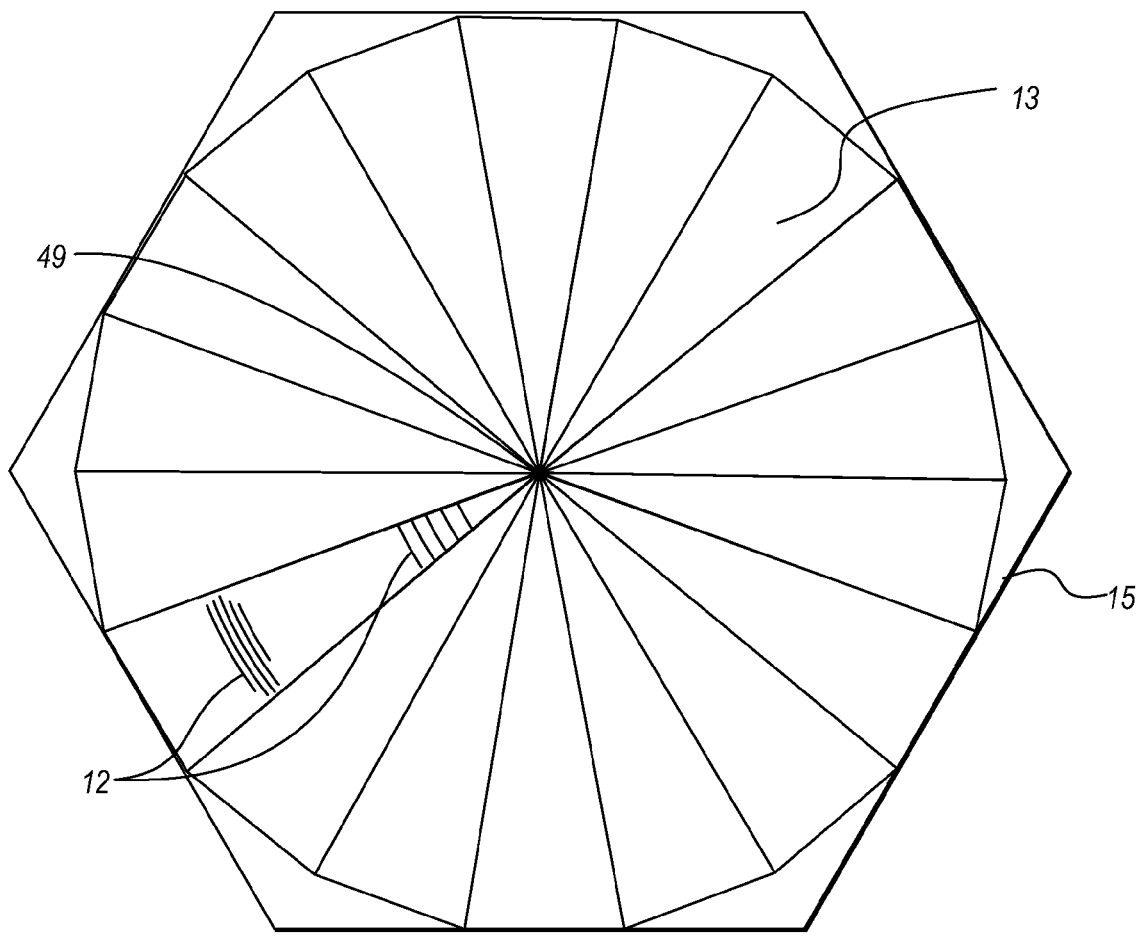
FIG. 8 is an embodiment of a solar collector configured with Fresnel lens angular segments manufactured with the die roller of FIGS. 5-7.

Referring first to FIG. 1 and FIG. 2, a preferred embodiment of the die roller 1 of the present invention is shown. Referring also to FIG. 3, a planar view 2 of the entire curvilinear surface 3 of the die roller of FIG. 1, including the segment dies 6 and the facet die pattern 8 of the facet dies 4, is shown. This particular embodiment of the die roller 1 provides for the extrusion of angular lens sub-segments 5, namely an inner lens sub-segment 7 and an outer lens sub-segment 9 having Fresnel lens facets 12 which may be used for the assembly of a solar collector 10 of the type shown in FIG. 4. By contrast, for the embodiment of the die roller 1 shown in FIG. 5 and FIG. 6, the segment dies 6 and the facet die pattern 8 of the facet dies 4, which are shown in the planar view 2 of the curvilinear surface 3 of this embodiment in FIG. 7, provide for the extrusion of angular lens segments 13 having Fresnel facets 12, which may be used for the assembly of the alternative solar collector 15 as shown in FIG. 8.

The die roller 1 of the present invention may preferably be utilized with a blank roller or a second die roller as disclosed in the Johnson Patents. However, other mechanisms for use with the die roller of the present invention in the extrusion of Fresnel lens will be known to persons of ordinary skill in the art.

Figure 9:
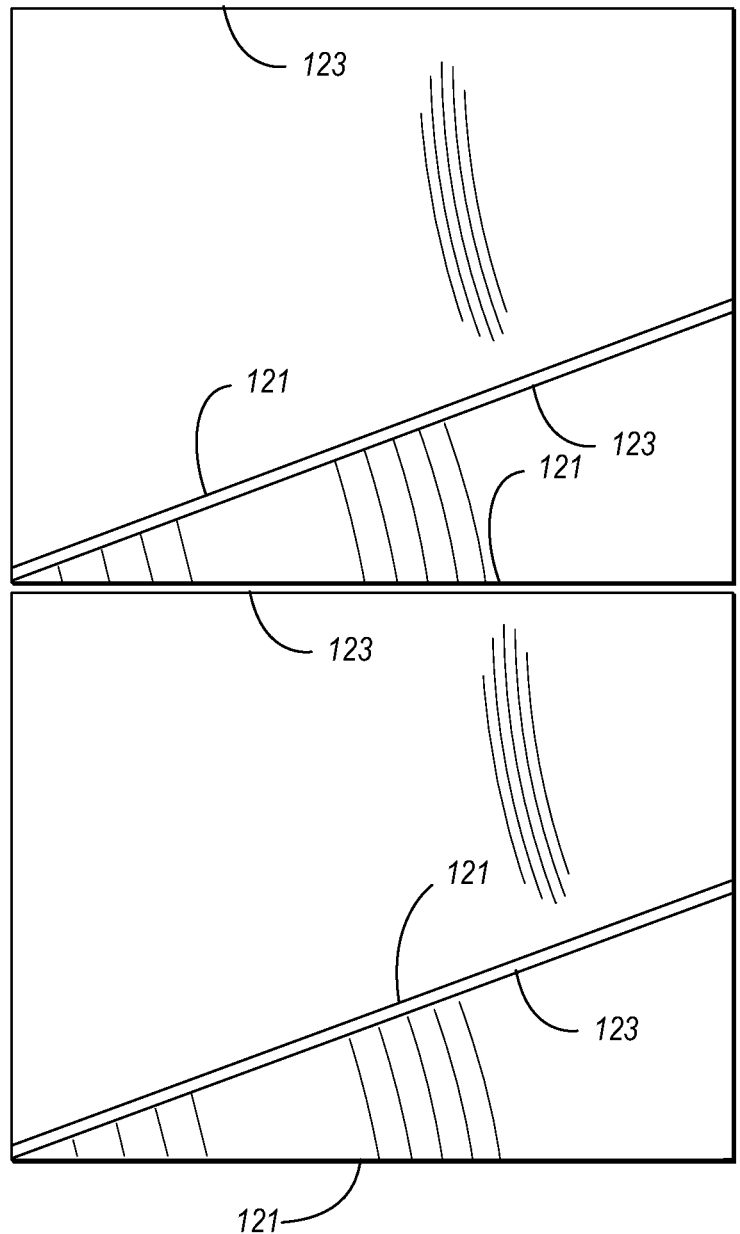
FIG. 9 is a planar view of the surface of an alternative preferred embodiment of the die roller of the present invention for manufacturing Fresnel lens angular subsegments.
Figure 10:
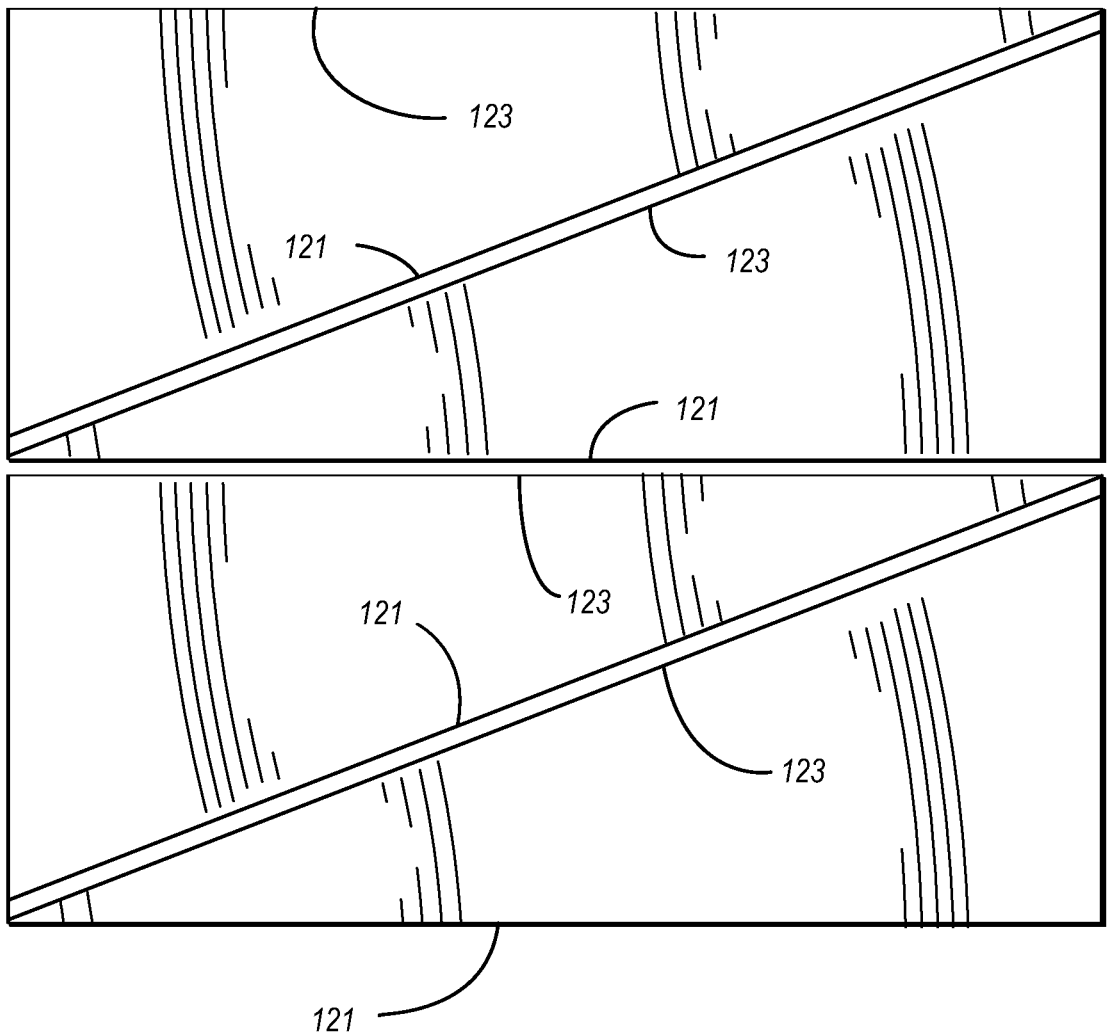
FIG. 10 is a planar view of the surface of an alternative preferred embodiment of the die roller of the present invention for manufacturing Fresnel lens angular segments.
Figure 11:
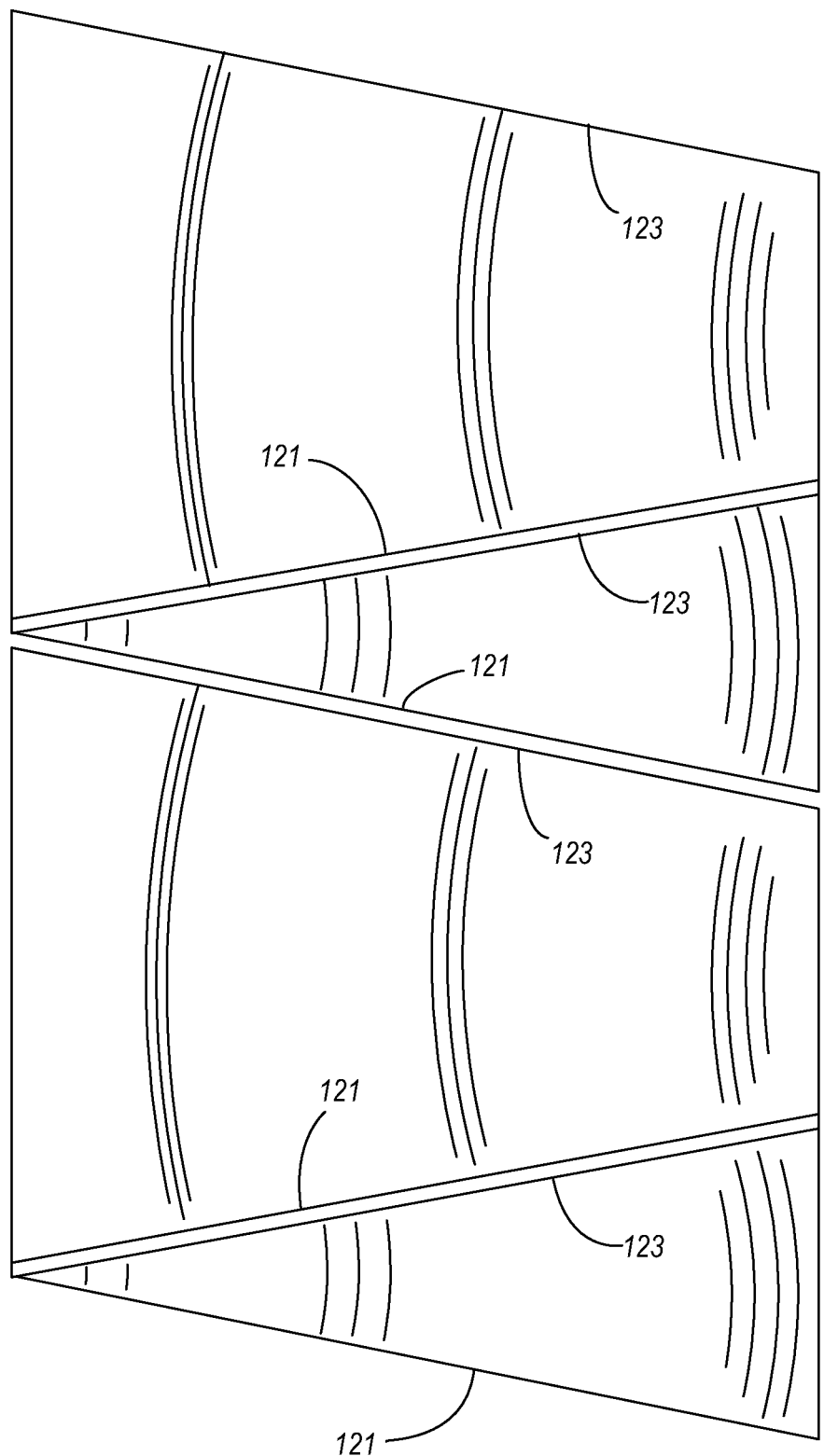
FIG. 11 is a planar view of the surface of an alternative preferred embodiment of the die roller of the present invention for manufacturing two sets of Fresnel lens angular subsegments per revolution of the die roller.
Figure 12:
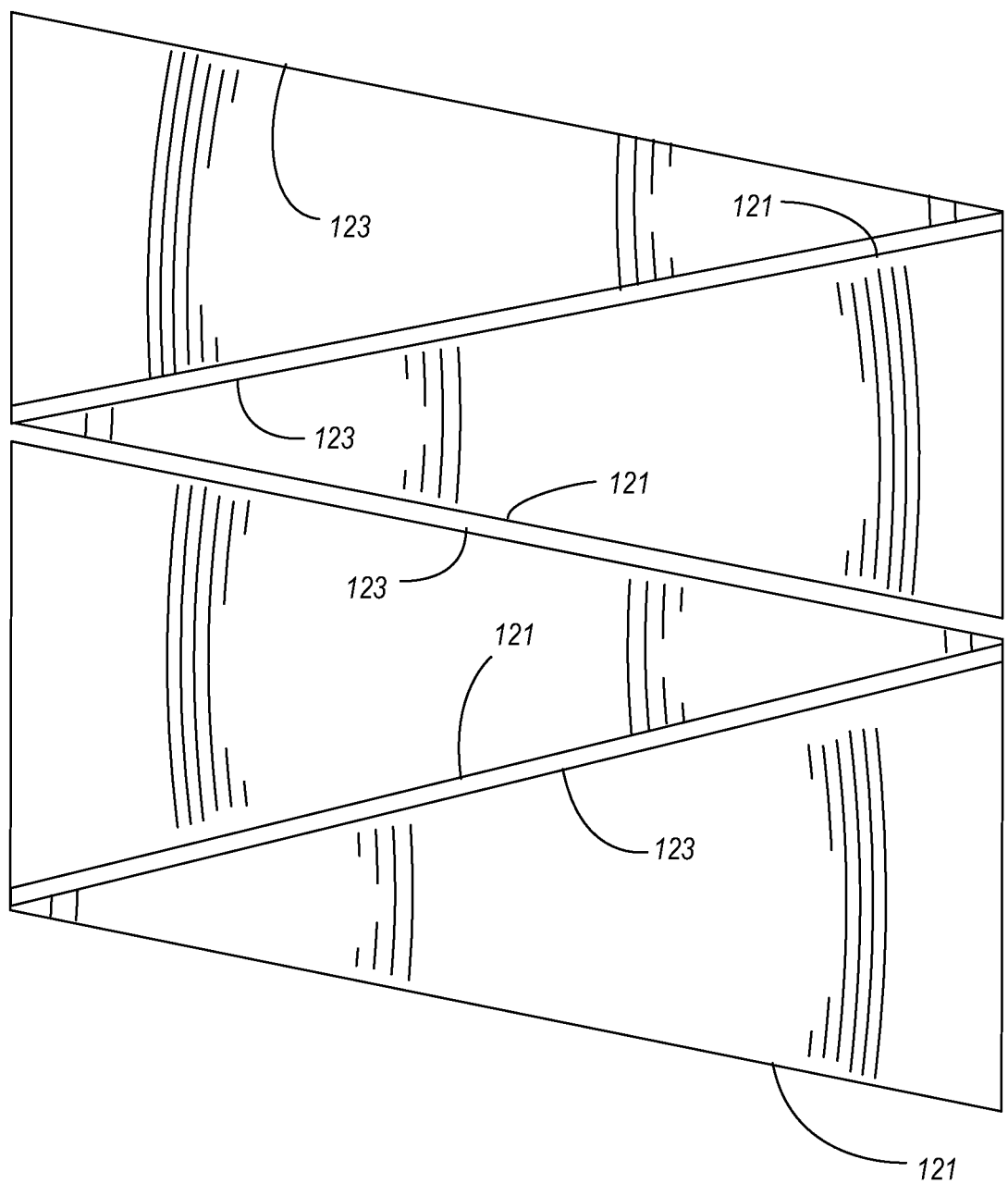
FIG. 12 is a planar view of the surface of an alternative preferred embodiment of the die roller of the present invention for manufacturing two sets of Fresnel lens angular segments per revolution of the die roller.

A planar view 2 of the curvilinear surfaces of further alternative die roller embodiments with one of the segment dies 21 running parallel to the axis of rotation 23 of the die roller are shown in FIG. 9 and FIG. 10. Still further embodiments may provide for the extrusion of more than one pair of angular lens sub-segments 5 or angular lens segments 13 with each revolution of the die roller. Curvilinear surfaces 3 of embodiments of die rollers providing for the extrusion of two sub-segment pairs 25 and two segment pairs 27 are shown in FIG. 11 and FIG. 12 respectively.

Figure 13:
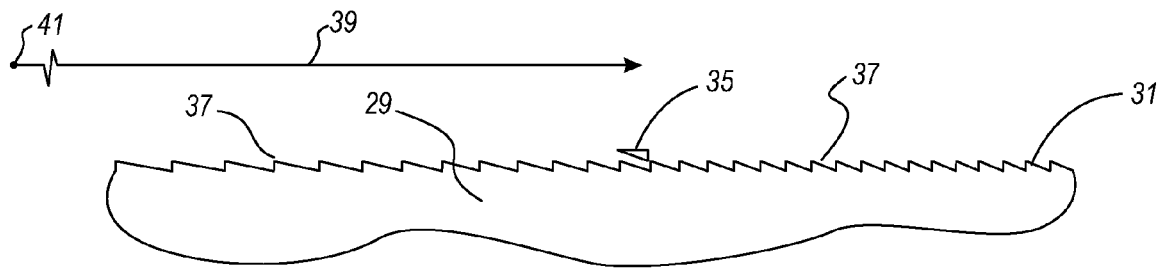
FIG. 13 is a vertical cross-section detail of a portion of the surface of a preferred embodiment of the die roller of the present invention.
Figure 14:
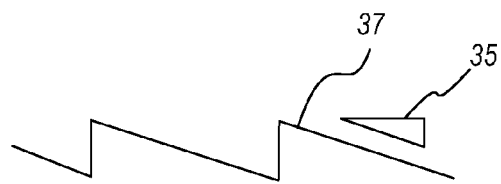
FIG. 14 is a vertical cross-section detail of die facets of the die roller of the present invention.
Figure 15:
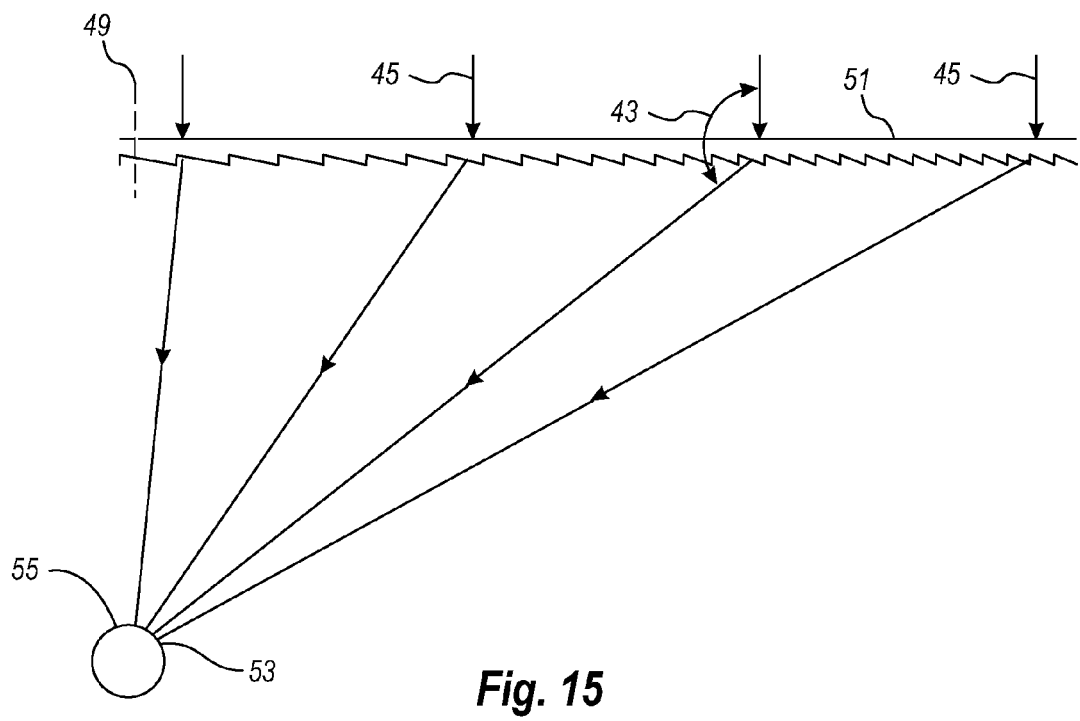
FIG. 15 is a ray diagram illustrating focusing, on the focal zone of a solar absorber, of incident solar radiation by a Fresnel lens manufactured using the die roller of the present invention.
Figure 25:
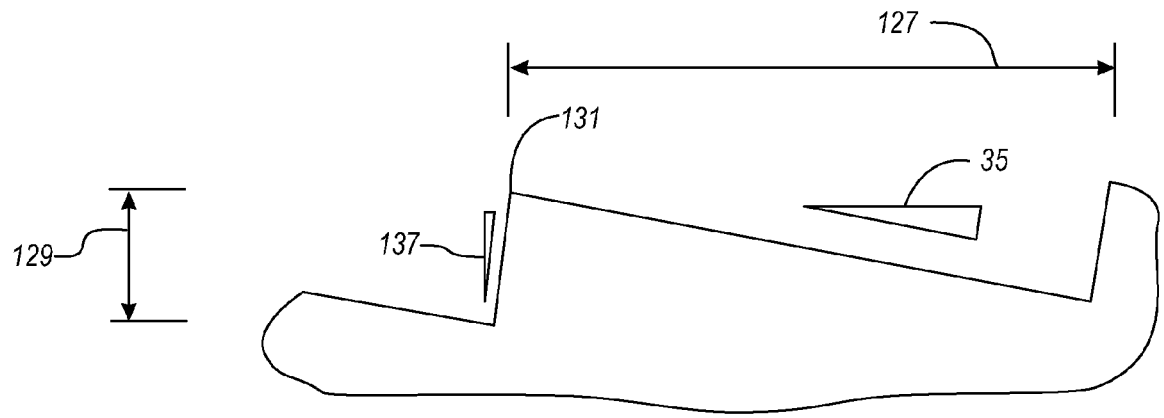
FIG. 25 is a vertical cross-section detail of a typical die facet for die facets positioned near the center of curvature of a preferred embodiment of the die roller of the present invention.
Figure 26:
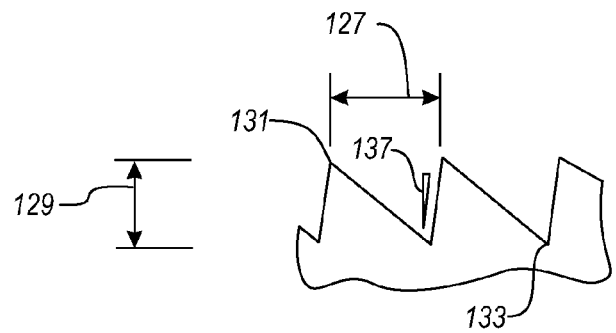
FIG. 26 is a vertical cross-section detail of a typical die facet for die facets positioned near the edge of the die roller away from the center of curvature of a preferred embodiment of the die roller of the present invention.

Referring now to FIG. 13, a typical longitudinal cross-section 29 of a portion of the die roller surface 31, such as along the longitudinal line 33 indicated on FIG. 3, is illustrated. Referring also to FIG. 14, the facet die pitch 35 of the Fresnel facet dies 4 increases with radial displacement 39 from the center of curvature 41 as shown in FIG. 3. This is necessary because the amount of refraction (bending) 43 of the rays of incident solar radiation 45 must be progressively greater with radial distance 47 from the center 49 of the extruded Fresnel lens segment 51 in order for the lens to focus the incident radiation 45 on the focal zone 53 of a solar energy absorber 55 as shown in FIG. 15. Referring also to FIG. 25 and FIG. 26, for some preferred embodiments, the facet die height 129 will be the same, regardless of position, while the facet die length 127 decreases as the facet die pitch 35 increases with radial displacement 39 from the center of curvature 41.

Figure 16:
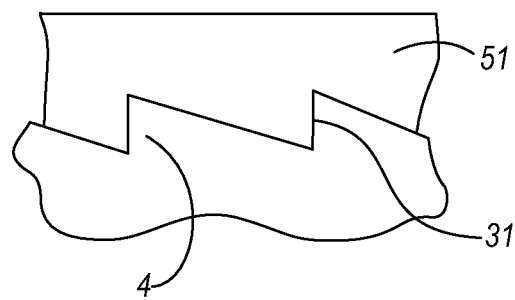
FIG. 16 is a vertical cross-section detail of die facets of the die roller of present invention in contact with lens facets of an extruded lens.
Figure 17:
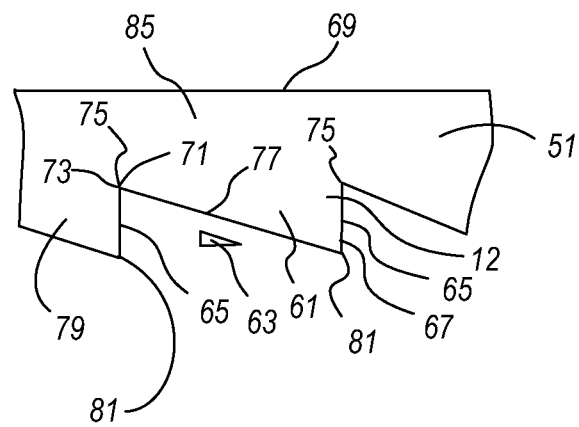
FIG. 17 is a vertical cross-section detail of die facets of the die roller of present invention in contact with lens facets of an extruded lens.

Referring now to FIG. 16, a cross-section of a portion of the surface of an embodiment of a Fresnel die roller 31 and a portion of a Fresnel lens segment 51 in contact with and being extruded by the Fresnel die roller is shown. Referring also to FIG. 17, a portion of an extruded Fresnel lens segment or sub-segment 51 having Fresnel facets 12 with an ideal cross-section 61 is shown. The ideal cross-section has a facet pitch 63 which will provide for the desired refraction of the incident solar radiation and a facet collar 65 which has a facet collar surface 67 which is perpendicular to the planar lens surface 69. The facet toe 71 of a Fresnel facet 12 will preferably be contiguous to the facet heel 73 of the adjacent facet. This minimizes the amount of incident solar radiation passing a non-refracting surface.

Figure 18:
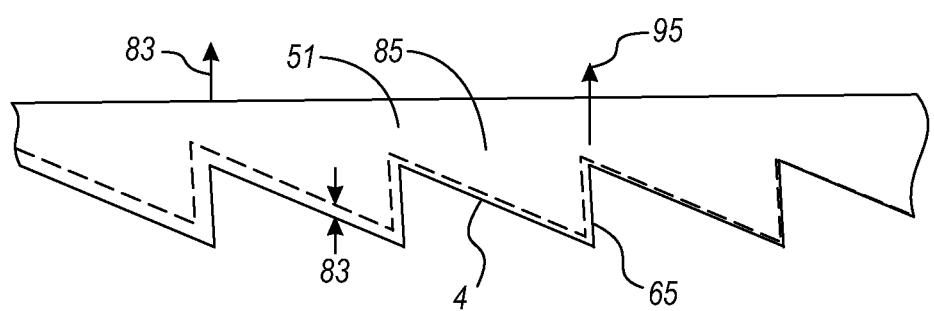
FIG. 18 is a vertical cross-section detail of lens facets of an extruded lens being separated from die facets of the die roller of present invention.
Figure 20:
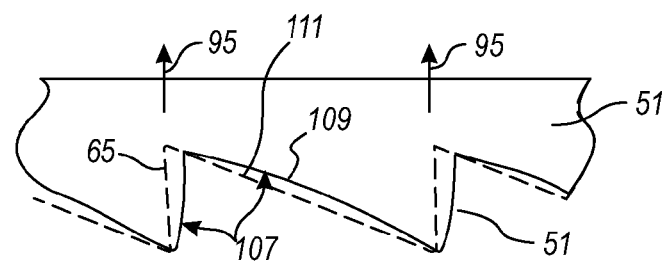
FIG. 20 is a vertical cross-section detail of lens facets of an extruded lens illustrating typical lens facet distortion for Fresnel lenses manufactured not using the die roller and the method of the present invention.

Unfortunately the optimal abrupt facet junction 75, as shown in FIG. 17, between the refracting surface 77 of a Fresnel facet 12 and the facet collar 65 of the adjacent facet 79 as well as the optimal abrupt facet crown 81, which is the junction between the facet collar 65 and the refracting surface 77 of a Fresnel facet, are problematical for the extrusion separation 83, as illustrated in FIG. 18, of the lens medium 85 of the extruded lens 51 segment or sub-segment from the facet dies 4 of the die roller 1. Further, referring also again to FIG. 3, the facet die orientation 89 of a facet die at a particular position on the die roller surface 93 with respect to the die tangential progression 91 at a particular die position 103 on the roller, i.e. from the direction of rotation of the die roller surface 93, as well as the corresponding Fresnel facet orientation for an extruded lens segment or sub-segment 51, may also be problematic, depending on the magnitude and direction of the facet die offset angle 105 between the facet die orientation 89 and the die tangential progression 91, the cross-section of the facet die and other factors listed above. The facet die orientation 89, and hence the facet die offset angle 105, will vary with the facet offset 125 of the die position 103 of a facet die 4 from the adjacent segment die 6. Also, referring to FIG. 20, depending on the facet die orientation 89, the cross-section of the facet die, and other factors listed above, the collar radial orientation 95 of the facet collars 65 for a theoretically optimum facet die 111 illustrated in FIG. 20, is also problematic for the extrusion separation 83 of the die roller from the lens medium 85 of the extruded lens segment or sub-segment 51. An example of a lens deformation 107 caused by forces exerted on the extruded lens segment or sub-segment 51 by the facet dies of the die roller at the time of separation is illustrated in FIG. 20, which imposes an illustration of a cross-section of deformed Fresnel facets 109 of an extruded lens segment or sub-segment 51 on a cross-section of a theoretically optimum facet die 111.

Figure 19:
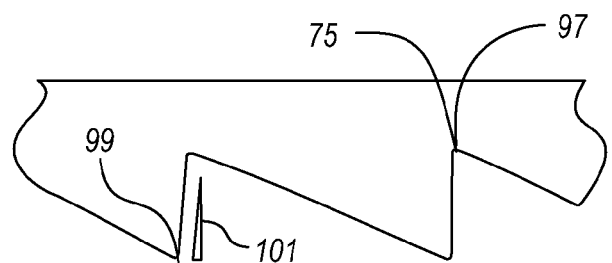
FIG. 19 is a vertical cross-section detail of lens facets of an extruded lens having facet collars with a collar slope and having crown rounding and junction rounding.
Figure 21:
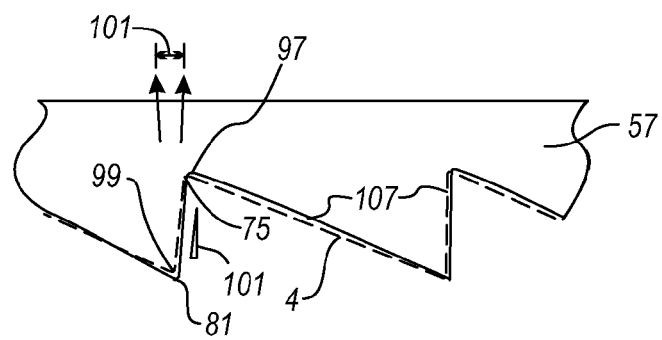
FIG. 21 is a vertical cross-section detail of lens facets of an extruded lens illustrating the reduced lens facet distortion for Fresnel lenses manufactured using the die roller and the method of the present invention.
Figure 22:
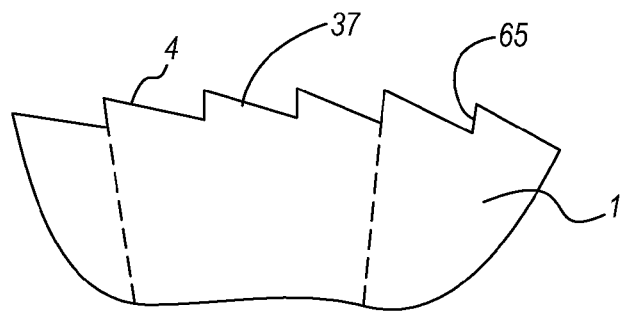
FIG. 22 is a vertical cross-section detail of a portion of the surface of a preferred embodiment of the die roller of the present invention.
Figure 23:
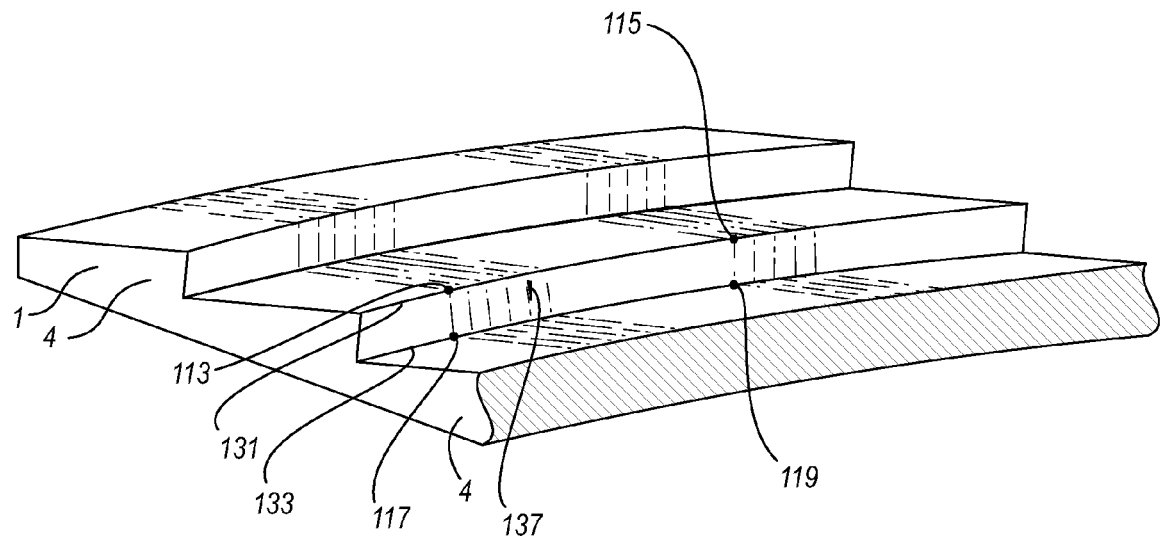
FIG. 23 is a perspective top view detail of a portion of the surface of a preferred embodiment of the die roller of the present invention.
Figure 24:
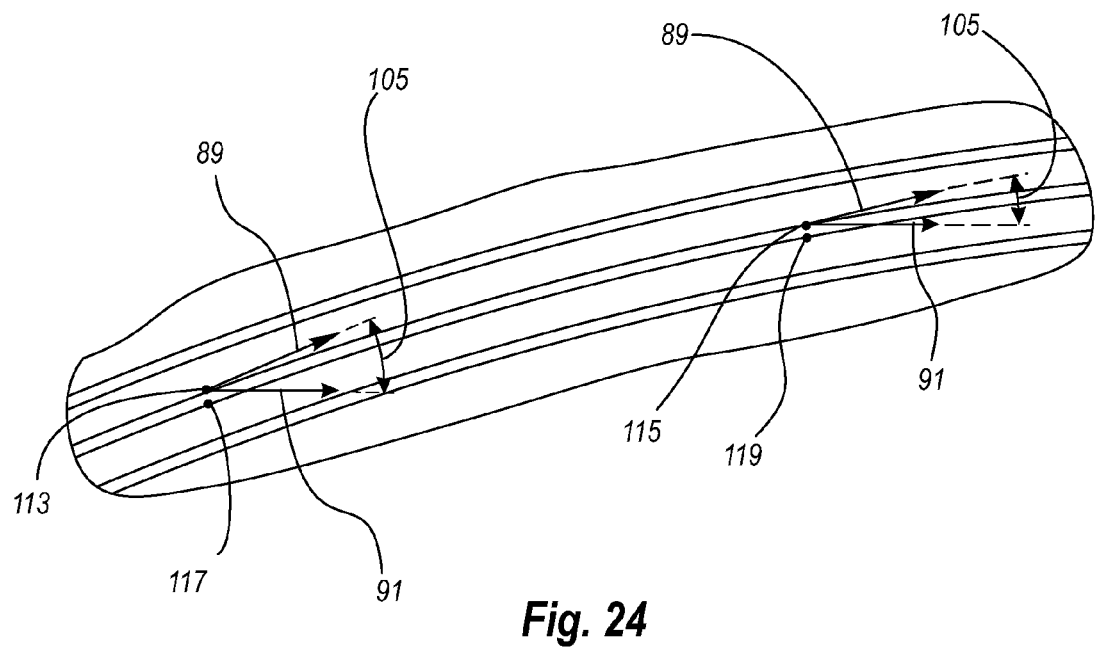
FIG. 24 is plan view detail of a portion of the surface of a preferred embodiment of the die roller of the present invention.

Referring also to FIG. 21, FIG. 22 and FIG. 23, a preferred embodiment of a facet die 4 of the die roller 1 of the present invention, regardless of the die pattern, i.e. the design of the angular lens segment or sub-segments to be extruded, may have a rounded facet die peak 131 which provide for lens junction rounding 97 of each lens facet junction 75; may have a rounded facet die base 133 which provides for lens crown rounding 99 of each lens facet crown 81; and may have a sloped facet die collar 135 providing for a lens collar slope 101, as shown in FIG. 19, in order to reduce the lens deformation 107 at lens separation 83 of the extruded lens segment or sub-segment 51 from the die roller 1 as shown on FIG. 18. Referring also to FIG. 23 and FIG. 24, certain embodiments of the die roller may provide for a variation in the degree of lens junction rounding 97 of the lens facet junction 75 and the degree of lens crown rounding 99 of the lens facet crown 81 based on the facet die orientation 89 and the resultant facet die offset angle 105 which vary from one facet die peak point 113 and the corresponding facet die base point 117 to a successive facet die peak point 115 and the corresponding facet die base point 119. Similarly, the facet die collar slope 137 of the facet die collar 135 may provide for a variation in the collar slope 101 depending upon the facet die orientation 89, facet die cross-section, and other factors identified above. For positions on the die roller where the separation of the extruded lens from the facets of the die roller will be difficult, the junction rounding 97, the crown rounding 99, the facet collar slope 101 or any or all of them, may be varied as needed to minimize the resistance to extrusion separation 83 of the Fresnel facets 12 of the extruded lens from the facet dies 4 and to minimize the resultant deformation 107 of the Fresnel facets of the extruded lens.

Other factors which may affect the optimization of the cross-section of the facet dies 4 at a particular point include at least the following:
   a. The type of lens medium from which the lens segments or sub-segments are being extruded.
   b. Feed temperature of the lens medium.
   c. Roller temperature.
   d. Roller speed.
   e. Roller diameter.
   f. Ambient temperature and humidity.
   g. Lens thickness.
   h. The specific heat of the lens medium.
   I. The thermal conductivity of the lens medium.
   j. The specific heat of the roller surface material.
   k. The thermal conductivity of the roller surface material.
   l. Facet die cross-section.

Simplified embodiments of the die roller 1 of the present invention may provide for uniform crown rounding 99 or uniform junction rounding 97 or both. Similarly, while simplified embodiments of the present invention could provide for a uniform collar slope 101 this would result in a reduction in the efficiency of the lens. Consequentially preferred embodiments of the die roller 1 of the present invention will provide for variation in the crown rounding, junction rounding, and collar slope depending upon the facet orientation 89 and the resultant facet die offset angle 105.

Referring again also to FIGS. 3, 7, 9, 10, 11, and 12, it will be noted that facet orientation 89 varies significantly from the segment forward edge 121 to the segment rear edge 123 for most of the facets. Thus, in order to minimize deformation of the facet, collar slope 101 will preferably be varied for all, most, or at least a substantial portion of the facets between the segment forward edge 121 and the segment rear edge 123.

Figure 27:
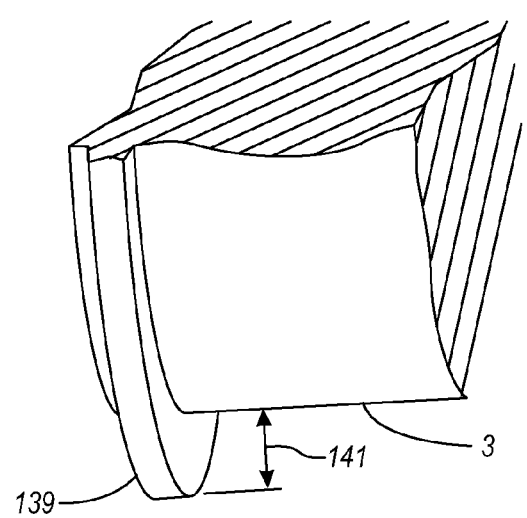
FIG. 27 is a perspective front view detail of a safety ring for maintaining minimum roller clearance between the die roller and any adjacent roller.

Referring to FIG. 27, the die roller 1 may have a safety ring 139, preferably affixed to the roller near the inner edge or the outer edge of the roller. The safety ring maintains a minimum roller clearance 141 between the die roller and any adjacent roller, thereby preventing damage from roller contact in the course of normal use.

A die algorithm may utilize one or more "facet factors", which are defined for this application, including the claims, to mean any or all of the following factors, as well as others which may be deemed desirable by persons with skill in the art, for use in determining one or more of collar slope, crown rounding, or junction rounding:
  a. Facet die orientation
  b. Facet die cross-section
  c. Type of lens medium from which the lens segments or sub-segments are being extruded.
  d. Feed temperature of the lens medium.
  e. Roller temperature.
  f. Roller speed.
  g. Roller diameter.
  h. Ambient temperature and humidity.
  I. Lens thickness.
  j. Specific heat of the lens medium.
  k. Thermal conductivity of the lens medium.
  l. Specific heat of the roller surface material.
  m. Thermal conductivity of the roller surface material.

The algorithm may be used to vary the weight or importance of any or all of the facet factors when manufacturing the die roller of the present invention. While the present inventor believes that collar slope is the most important consideration in minimizing facet deformation at the time of separation of the facet die and the Fresnel facet of the extruded lens, other users may conclude otherwise.

The roller surface 3 of the die roller 1, for preferred embodiments, has a surface base plating 143 of a malleable metal or alloy, the roller surface having a plurality of facet dies 12 formed in the surface base plating. For preferred embodiments, the metal or alloy of the surface base plating has a high thermal conductivity. Under a preferred embodiment of the method of the present invention, the facet dies are etched in the surface plating. A preferred metal for the surface base plating is a copper alloy, one that may be etched to a high degree of precision, but will hold the form of the facet dies through long term, repetitive use at the high temperature required for the extrusion of the Fresnel lens segments or sub-segments. For preferred embodiments, the surface base plating is further plated with a finish plating 145 of hardening metal or alloy after the facet dies are etched in the surface base plating. For preferred embodiments, the metal or alloy of the finish plating also has a high thermal conductivity.

Other embodiments and other variations and modifications of the embodiments described above will be obvious to a person skilled in the art. Therefore, the foregoing is intended to be merely illustrative of the invention and the invention is limited only by the following claims and the doctrine of equivalents.

What is claimed is:

1. Die roller for use in manufacturing, from plastic, Fresnel lens angular lens segments for a Fresnel lens solar collector, the Fresnel lens angular lens segments having a plurality of lens facets, the die roller having a roller surface and a roller radius, the die roller providing for reducing a distortion of the lens facets during manufacturing, the die roller comprising:
   one or more segment dies on the roller surface; and
   a plurality of curvilinear Fresnel facet dies formed in the roller surface, each Fresnel facet die having a respective facet die collar with a respective facet die collar slope, each facet die collar slope being varied respectively according to a die algorithm based on one or more facet factors, one of the facet factors being facet die orientation which varies with facet die position on the die roller surface.

2. The die roller recited in claim 1 wherein the Fresnel facet dies have a facet die peak and the facet die peak of one or more of the Fresnel facet dies is rounded according to the die algorithm based on one or more facet factors.

3. The die roller recited in claim 1 wherein the Fresnel facet dies have a facet die base and the facet die base of one or more of the Fresnel facet dies is rounded according to the die algorithm based on one or more facet factors.

4. The die roller recited in claim 1 wherein the roller surface has a surface base plating and the Fresnel facet dies are etched in the surface base plating.

5. The die roller recited in claim 4 wherein the surface base plating is further plated with a finish plating after the facet dies are etched in the surface base plating.

6. Die roller for use in manufacturing, from plastic, Fresnel lens angular lens sub-segments for a Fresnel lens solar collector, the Fresnel lens angular lens sub-segments having a plurality of lens facets, the die roller having a roller surface and a roller radius, the die roller providing for reducing a distortion of the lens facets during manufacturing, the die roller comprising:
   one or more segment dies on the roller surface; and
   a plurality of curvilinear Fresnel facet dies formed in the roller surface, each Fresnel facet die having a respective facet die collar with a respective facet die collar slope, each facet die collar slope being varied respectively according to a die algorithm based on one or more facet factors, one of the facet factors being facet die orientation which varies with facet die position on the die roller surface.

7. The die roller recited in claim 6 wherein the Fresnel facet dies have a facet die peak and the facet die peak of one or more of the Fresnel facet dies is rounded according to the die algorithm based on one or more facet factors.

8. The die roller recited in claim 6 wherein the Fresnel facet dies have a facet die base and the facet die base of one or more of the Fresnel facet dies is rounded according to the die algorithm based on one or more facet factors.

9. The die roller recited in claim 6 wherein the roller surface has a surface base plating and the Fresnel facet dies are etched in the surface base plating.

10. The die roller recited in claim 9 with a finish plating after the facet dies are etched in the surface base plating.

11. Method for making a die roller for use in manufacturing, from plastic, Fresnel lens angular lens segments for a Fresnel lens solar collector, the Fresnel lens angular lens segments having a plurality of lens facets, the die roller having a roller surface and a roller radius, the die roller providing for reducing a distortion of the lens facets during manufacturing, the method comprising:

a) forming one or more segment dies on the roller surface;

b) forming a plurality of curvilinear Fresnel facet dies on the roller surface, each Fresnel facet die having a respective facet die collar with a respective facet die collar slope, each facet die collar slope being varied respectively according to a die algorithm based on one or more facet factors, one of the facet factors being facet die orientation which varies with facet die position on the die roller surface.

12. The method recited in claim 11 wherein the Fresnel facet dies have a facet die peak and the facet die peak of one or more of the Fresnel facet dies is rounded according to the die algorithm based on one or more facet factors.

13. The method recited in claim 11 wherein the Fresnel facet dies have a facet die base and the facet die base of one or more of the Fresnel facet dies is rounded according to the die algorithm based on one or more facet factors.

14. The method recited in claim 11 wherein the roller surface has a surface base plating and the Fresnel facet dies are etched in the surface base plating.

15. The method recited in claim 14 wherein the surface base plating is further plated with a finish plating after the facet dies are etched in the surface base plating.

16. Method for making a die roller for use in manufacturing, from plastic, Fresnel lens angular lens sub-segments for a Fresnel lens solar collector, the Fresnel lens angular lens sub-segments having a plurality of lens facets, the die roller having a roller surface and a roller radius, the die roller providing for reducing a distortion of the lens facets during manufacturing, the method comprising:

a) forming one or more segment dies on the roller surface;

b) forming a plurality of curvilinear Fresnel facet dies on the roller surface, each Fresnel facet die having a respective facet die collar with a respective facet die collar slope, each facet die collar slope being varied respectively according to a die algorithm based on one or more facet factors, one of the facet factors being facet die orientation which varies with facet die position on the die roller surface.

17. The method recited in claim 16 wherein the Fresnel facet dies have a facet die peak and the facet die peak of one or more of the Fresnel facet dies is rounded according to the die algorithm based on one or more facet factors.

18. The method recited in claim 16 wherein the Fresnel facet dies have a facet die base and the facet die base of one or more of the Fresnel facet dies is rounded according to the die algorithm based on one or more facet factors.

19. The method recited in claim 16 wherein the roller surface has a surface base plating and the Fresnel facet dies are etched in the surface base plating.

20. The method recited in claim 19 wherein the surface base plating is further plated with a finish plating after the facet dies are etched in the surface base plating.

* * * * *